United States Patent Office 3,540,322
Patented Nov. 17, 1970

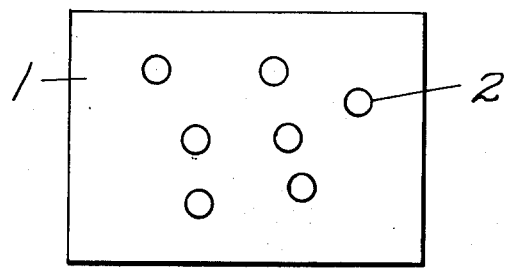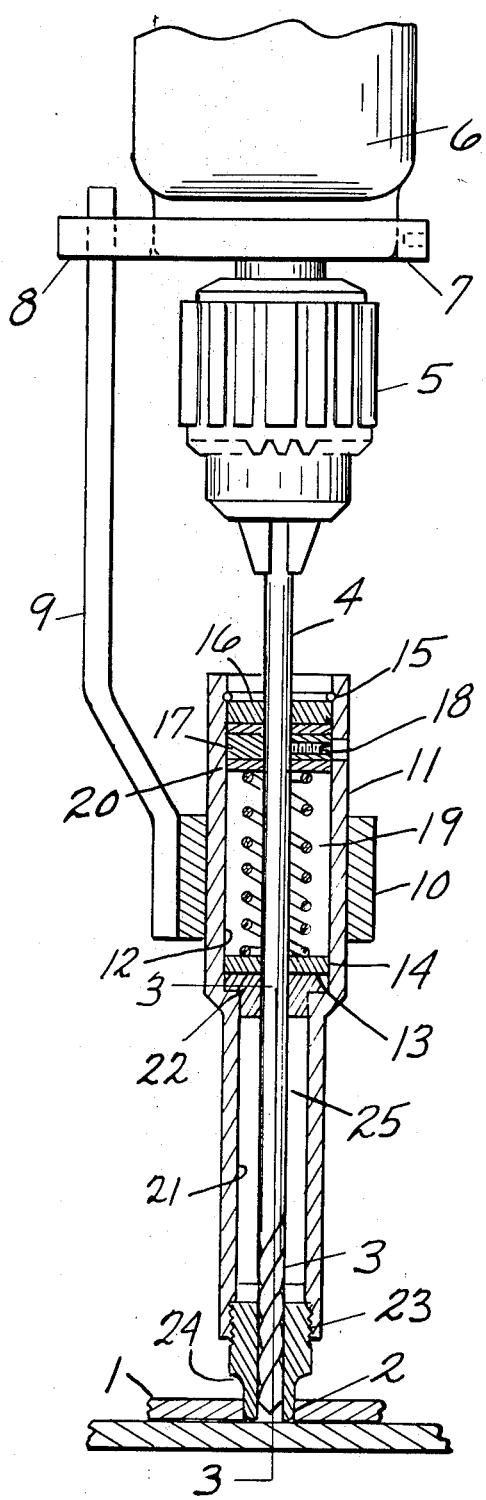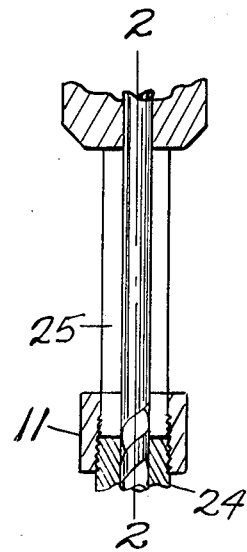

3,540,322
DRILL FIXTURES
Carl E. Swanson, 707 E. South St., Corry, Pa. 16407
Filed Aug. 9, 1968, Ser. No. 751,488
Int. Cl. B23b 47/28
U.S. Cl. 77—55                             4 Claims

ABSTRACT OF THE DISCLOSURE

A drill fixture having a body with its upper end slidably and rotatably journaled on the shank of a drill, its lower end provided with a drill guide bushing receivable in a guide hole in a template and its intermediate section provided with a window opposite a portion of the shank of the drill for chip removal. In use, the template is placed over this work piece and the drill guide bushing is inserted in the template where it remains stationary while the drill is fed through the bushing to drill the work piece.

---

This invention is intended to reduce the cost of fixtures for drilling holes by mounting the drill bushing in a holder in which the drill is journaled. With this structure a single drill bushing can be used for drilling a large number of holes of the same size and the jig or fixture for locating the holes need consist only of a plate having punched or reamed holes of size to receive the bushing.

In the drawing FIG. 1 is a top plan view of a template, FIG. 2 is an elevation in section on line 2—2 of FIG. 3, and FIG. 3 is a fragmentary section on line 3—3 of FIG. 2.

The template for locating the holes to be drilled consists of a plate 1 having a plurality of holes 2 extending through the plate and of the diameter to receive a drill bushing. In prior conventional practice, a drill bushing would be welded or otherwise fixed to the plate at each hole. Since the drill bushings are precision parts of hardened steel, the cost of the bushings and of the installation may be excessive for short production runs.

In order to reduce the cost and at the same time maintain the accuracy, it is proposed that the usual drill bushings be omitted and that a single drill bushing be mounted on the drill so that it can be moved from hole to hole.

In the structure for accomplishing this result, the drill 3 has its shank 4 fixed in the usual chuck 5. The chuck could be on a hand drill 6 as shown or on a drill press. A stationary collar 7 fixed to the hand drill 6 has a guide member 8 slidably receiving a vertical rod 9 having fixed to its lower end a sleeve 10 clamped to a body 11 concentric with the drill shank. The body 11 may move axially relative to the drill 6 but is prevented from rotating relative to the drill.

In the upper end of the body 11 is an enlarged bore 12 having a seat 13 at its lower end for an anti-friction bearing 14 and having a snap ring 15 at its upper end for holding a thrust washer 16. A collar 17 fixed to the drill shank 4 by a set screw 18 freely rotates within the bore 12. A coil spring 19 arranged between the bearing 14 and a bearing 20 holds the bearing 14 against the shoulder 13 and biases the body 11 downward relative to the drill shank.

In the lower end of the body is an upwardly extending cavity 21 closed at its upper end by a section 22 through which the drill shank 4 rotatably extends. The section 22 is preferably a hardened steel bushing which is readily removable to accommodate changes in drill size. The lower end of the body is threaded at 23 to receive a hardened steel drill bushing 24 having its lower end sized to fit the holes 2 in the template. Above the bushing 24, the body 11 is cut away to provide windows 25 for chip removal. Several factors contribute to the chip removal. First, the inside diameter of the bore 21 is substantially greater than the outside diameter of the drill. Second, the section 22 is opposite the smooth shank 4 or above the unfluted section of the drill. Third, the height of the windows 25 is much greater than the diameter of the drill so that ample room is provided for the escape of chips.

In the use of the drill, the template 1 is positioned on the work piece and the lower end 24 of the bushing is inserted in the desired pilot hole 2. The hole may now be drilled by exerting downward pressure on the drill. When the hole is completed, the spring 19 lifts the drill clear of the work.

The fixture greatly reduces the cost of drill jigs without sacrificing accuracy. Since the drill bushing does not rotate, there is very little tendency to wear the pilot holes 2 in the template. The drill is held in alignment with the bushing so lateral forces which could wear the bushing are prevented.

What is claimed as new is:

1. A drill fixture having a hollow body with a central partition dividing it into upper and lower cavities, a drill having a fluted portion within and extending below the lower cavity and a smooth shaft within both the upper and lower cavities and extending above the upper cavity with its upper end adapted to be connected to a power drive, upper and lower axially spaced bearings within the upper cavity journaling the shank for axial and rotatable movement relative to the body, the upper bearing being in thrust relation to the shank and the lower bearing being in thrust relation to the body, biasing means between said bearings for urging the shank upward relative to the body, a drill bushing fixed to the lower end of the body and surrounding a fluted portion of the drill, chip escape windows in said body below said partition and with the upper parts of the windows opposite the smooth shank for conducting chips from the lower cavity, and a template to be placed over a work piece to be drilled, said template having a hole receiving the drill bushing to locate the body in the template so that by downward pressure from the power drive the drill may be fed through the bushing into a work piece underlying the template.

2. The fixture of claim 1 having slide means cooperative with the body to prevent rotation of it and of the drill bushing fixed thereto.

3. The fixture of claim 2 in which the slide means includes a vertical arm non-rotatably fixed to the body.

4. The fixture of claim 1 in which a thrust collar is fixed to the shank for connecting the upper bearing in thrust relation to the shank.

References Cited

UNITED STATES PATENTS

| | | | |
|---|---|---|---|
| 2,294,303 | 8/1942 | Jagow | 77—55 |
| 2,674,906 | 4/1954 | Timpner | 77—55 |

FOREIGN PATENTS 705,225   3/1931   France.

FRANCIS S. HUSAR, Primary Examiner

U.S. Cl. X.R.

77—62